(12) United States Patent
Scholte et al.

(10) Patent No.: US 9,520,120 B2
(45) Date of Patent: Dec. 13, 2016

(54) GENERATING A CONTROL SIGNAL BASED ON PROPAGATED DATA

(75) Inventors: Rick Scholte, Eindhoven (NL); Ines Lopez Arteaga, Eindhoven (NL); Henk Nijmeijer, Eindhoven (NL)

(73) Assignees: TECHNISCHE UNIVERSITEIT EINDHOVEN, Eindhoven (NL); SORAMA HOLDING B.V., Eindhoven (NL)

( * ) Notice: Subject to any disclaimer, the term of this patent is extended or adjusted under 35 U.S.C. 154(b) by 449 days.

(21) Appl. No.: 13/813,275

(22) PCT Filed: Jul. 27, 2011

(86) PCT No.: PCT/EP2011/062915
§ 371 (c)(1),
(2), (4) Date: Jan. 30, 2013

(87) PCT Pub. No.: WO2012/013708
PCT Pub. Date: Feb. 2, 2012

(65) Prior Publication Data
US 2013/0128703 A1    May 23, 2013

(30) Foreign Application Priority Data
Jul. 30, 2010  (EP) ..................................... 10171354

(51) Int. Cl.
*G03H 3/00*    (2006.01)
*A61B 7/00*    (2006.01)
(Continued)

(52) U.S. Cl.
CPC ............... *G10K 11/00* (2013.01); *G01H 3/125* (2013.01)

(58) Field of Classification Search
CPC ................................. G03H 3/00; G01R 23/00
(Continued)

(56) References Cited

U.S. PATENT DOCUMENTS 5,772,128 A * 6/1998 McRae ........................... 241/30
5,864,798 A * 1/1999 Miseki .................... G10L 19/26
704/217
(Continued)

FOREIGN PATENT DOCUMENTS

JP        07-253354 A    10/1995
JP        09-146443 A     6/1997
(Continued)

OTHER PUBLICATIONS

International Search Report for PCT/EP2011/062915 mailed Aug. 23, 2011.
(Continued)

*Primary Examiner* — Nam V Nguyen
(74) *Attorney, Agent, or Firm* — Nixon & Vanderhye, PC

(57) ABSTRACT

A system for generating a control signal comprises a data propagator (9) for propagating acoustic sensor array data relating to a set of acoustic measurements at a set of sensor positions covering an aperture towards a set of propagated positions to obtain propagated data relating to the set of propagated positions. A control signal generator (2) is arranged for generating a control signal based on the propagated data. The control signal generator (2) comprises a data analyzer (1) for analyzing the propagated data in a spatial frequency domain. The data propagator (9) is arranged for propagating the sensor array data in real-time and the control signal generator (2) is arranged for generating the control signal in real-time.

15 Claims, 2 Drawing Sheets

(51) Int. Cl.
  *G10K 11/00*   (2006.01)
  *G01S 3/80*    (2006.01)
  *G01H 3/12*    (2006.01)

(58) Field of Classification Search
  USPC ..... 367/124, 88, 153; 73/603, 643; 600/483; 606/34, 42
  See application file for complete search history.

(56) References Cited

U.S. PATENT DOCUMENTS

| | | | | |
|---|---|---|---|---|
| 5,886,276 | A * | 3/1999 | Levine | G10H 1/0058 |
| | | | | 704/209 |
| 6,308,715 | B1 * | 10/2001 | Weissman | A61B 5/0031 |
| | | | | 128/899 |
| 6,732,030 | B2 * | 5/2004 | Jones | G01B 17/06 |
| | | | | 701/29.1 |
| 7,053,228 | B2 * | 5/2006 | Burton et al. | 552/512 |
| 7,107,849 | B2 * | 9/2006 | Sugiyama | G01N 29/045 |
| | | | | 73/587 |
| 7,137,980 | B2 * | 11/2006 | Buysse | A61B 18/1206 |
| | | | | 606/34 |
| 7,170,849 | B1 * | 1/2007 | Arivoli et al. | 370/208 |
| 7,987,707 | B2 * | 8/2011 | Milde | 73/147 |
| 8,701,491 | B2 * | 4/2014 | Scholte et al. | 73/603 |
| 8,715,206 | B2 * | 5/2014 | Telfort et al. | 600/586 |
| 8,873,768 | B2 * | 10/2014 | Zurek | 381/92 |
| 2002/0059832 | A1 * | 5/2002 | Lee | 73/586 |
| 2003/0125889 | A1 * | 7/2003 | Sato | G10L 19/02 |
| | | | | 702/75 |
| 2003/0160862 | A1 * | 8/2003 | Charlier et al. | 348/14.08 |
| 2003/0169956 | A1 * | 9/2003 | Lange | G01B 11/16 |
| | | | | 385/12 |
| 2006/0100530 | A1 | 5/2006 | Kliot et al. | |
| 2009/0028347 | A1 * | 1/2009 | Duraiswami et al. | 381/26 |
| 2012/0059294 | A1 * | 3/2012 | Schubert | A61F 13/0203 |
| | | | | 601/46 |

FOREIGN PATENT DOCUMENTS

| | | |
|---|---|---|
| JP | 2002-540880 A | 12/2002 |
| JP | 2003-156387 A | 5/2003 |
| JP | 2004-085455 A | 3/2004 |
| JP | 2004-258533 | 9/2004 |
| JP | 2005-215833 A | 8/2005 |
| JP | 2006-153855 A | 6/2006 |
| JP | 2007-024663 A | 2/2007 |
| JP | 2007-225590 A | 9/2007 |
| JP | 2009-192299 A | 8/2009 |
| JP | 2009-210338 A | 9/2009 |
| WO | WO 2006/118047 A1 | 11/2006 |
| WO | WO 2007/084121 | 7/2007 |
| WO | WO 2009/130243 | 10/2009 |
| WO | WO 2010/003837 A1 | 1/2010 |

OTHER PUBLICATIONS

Written Opinion of the International Searching Authority mailed Aug. 23, 2011.
X. Schuurbiers, "Aliasing in PNAH", 20050601, vol. DCT 2005-85, Jun. 1, 2005, pp. 1-43.

* cited by examiner

GENERATING A CONTROL SIGNAL BASED ON PROPAGATED DATA

This application is the U.S. national phase of International Application No. PCT/EP2011/062915 filed 27 Jul. 2011 which designated the U.S. and claims priority to EP 10171354.3 filed 30 Jul. 2010, the entire contents of each of which are hereby incorporated by reference.

FIELD OF THE INVENTION

The invention relates to generating a control signal. The invention further relates to providing feedback information for use in a control system.

BACKGROUND OF THE INVENTION

In mechatronic systems, detection of component vibrations may be used to improve positioning or early failure detection. It is often not possible or undesirable to attach sensors to the vibrating components. Moreover, control systems are used in production lines to influence operation of devices used in the production lines.

Near-field acoustic holography (NAH) is a sound source identification technique based on measurements with an array of microphones arranged on a plane (hologram plane) close to a surface of an acoustic source. The array data is transformed to obtain information about the sound pressure and the vibration velocity distribution on the source surface. For example, the source of noise generated by a product may be localized using NAH.

Acoustic sensors in an array set-up are used to record acoustic signals. A method of performing near-field acoustic holography based on such recorded acoustic signals is described by R. Scholte in "Fourier based High-resolution Near-field Sound Imaging", PhD. Thesis, 2008, Eindhoven University of Technology. This method comprises the following steps. Establishing acoustic data representing a set of near-field acoustic holography measurements at a first set of positions. Applying a spatial frequency transform to the acoustic data to obtain data in a spatial frequency domain. Propagating the frequency-transformed acoustic data to obtain propagated frequency-transformed acoustic data, for example in a source plane. Applying a regularization in a wavenumber domain. Performing an inverse spatial frequency transform, to obtain acoustic data describing the acoustic vibrations at the source plane.

SUMMARY OF THE INVENTION

It would be advantageous to have an improved system for generating a control signal. To better address this concern, a first aspect of the invention provides a system comprising a data propagator for propagating acoustic sensor array data relating to a set of acoustic measurements at a set of sensor positions towards a set of propagated positions to obtain propagated data relating to the set of propagated positions; and a control signal generator for generating a control signal based on the propagated data.

Since the sensor array data is propagated from the set of sensor positions to the set of propagated positions, the propagated data relates to acoustics or vibrations at a set of propagated positions. Consequently, no sensors need to be present at the set of propagated positions, while still having accurate information of the vibrations and/or acoustics at the set of propagated positions. This information is used to generate a control signal. Consequently, it becomes possible to use the propagated data as input or feedback in a control system. This allows the control signal to more accurately reflect the situation at the propagated positions. The control signal may be supplied to an apparatus for at least partly controlling the operation of the apparatus. The control signal may thus be distinguished from a purely visual representation of the propagated data.

The control signal generator may comprise a data analyzer for analyzing the propagated data in a spatial frequency domain. The spatial frequency domain may provide sufficient information to base a control signal thereon, without first converting the data in the spatial domain. Moreover, it may be more computationally efficient to compute the data in the frequency domain. By deriving the control signal on the analysis of the sensor array data in the spatial frequency domain, computation time may be saved because it is not necessary to transform the data back into the spatial domain. For example, when applying acoustic holography by propagating the data in the spatial frequency domain, the data in the spatial frequency domain becomes available as part of the processing chain. The computations to transform the data from the spatial frequency domain back into the spatial domain may then be omitted.

The data analyzer may comprise a spatial frequency selector for separating at least one spatial frequency component in the sensor array data. Such a spatial frequency component may provide suitable information on which the control signal may be based. A particular spatial frequency component may be associated with a particular control event or a condition of a measured object.

The data analyzer may comprise a pattern recognition module for recognizing a pattern in the sensor array data in the spatial frequency domain, or in another kind of domain. A particular pattern may be associated with a particular control event or a condition of a measured object.

The data propagator may be arranged for propagating the sensor array data in real-time. Moreover, the control signal generator may be arranged for generating the control signal in real-time. This way, real-time control is provided.

The control signal generator may be arranged for detecting an alarm situation based on the propagated data and including a corresponding alarm signal in the control signal. This allows to take appropriate action in response to the alarm situation. For example, the system may comprise an alarm generator arranged for generating an alarm in response to the alarm signal. The alarm generator may be arranged for generating an auditive alarm and/or a visual alarm, for example.

The system may comprise a sensor array for collecting acoustic sensor array data relating to an apparatus or a product manufactured using the apparatus. Moreover, the control signal generator may be arranged for at least partly controlling the apparatus by means of the control signal. This allows operation of the apparatus to be controlled by the control signal, based on relevant acoustically measured information. For example, the system and the apparatus may form at least part of a closed control loop.

The acoustic sensor data may be used as feedback in the control loop. The system may be used for quality control, for example when the acoustic sensor array data relates to a product manufactured using the apparatus.

The propagated data may be indicative of a vibration or flexing of at least part of the apparatus or at least part of the product. These vibration or flexing may cause acoustic signals which may be detected by the acoustic sensors. This way, vibrations or flexing may be detected from a distance, without use of contact sensors.

The sensor array data may relate to a monitored patient. This allows to use the system in a medical monitoring apparatus.

The system may comprise an input for receiving the acoustic sensor array data representing a set of holography measurements at the set of sensor positions; and a spatial frequency transformer for applying a spatial frequency transform to the sensor array data to obtain transformed sensor array data in a spatial frequency domain;

wherein the data propagator is arranged for propagating the transformed sensor array data in the spatial frequency domain towards the set of propagated positions to obtain the propagated data relating to the set of propagated positions in the spatial frequency domain.

This is an example implementation of acoustic holography. This provides high accuracy input for the control signal generator. The acoustic holography may comprise near-field acoustic holography. The control signal generator may be arranged for analyzing the propagated data in the spatial frequency domain.

The system may comprise a further spatial frequency transformer for performing an inverse spatial frequency transform to the propagated data to obtain reconstructed acoustic data in a spatial domain, representing an acoustic signal at the set of propagated positions. This allows the control signal generator to base the control signal on the propagated data in a spatial domain. This allows to use spatial information to generate the control signal. The control signal generator may be arranged for analyzing the propagated data in the spatial domain. The control signal generator may also be arranged for analyzing the propagated data in both the spatial domain and the spatial frequency domain.

The further spatial frequency transformer may be arranged for performing the inverse spatial frequency transform in response to an alarm situation indicated by the control signal. This allows to view the spatial distribution of the propagated data when it is needed because of an alarm situation, without having to perform the inverse spatial frequency transform when it is not needed. It also allows to identify the source of the alarm situation.

The system may comprise a pattern recognition module for detecting a location of a cause of the alarm situation, based on a result of the inverse spatial frequency transform. This allows to automate the localization of the cause of the alarm situation. This may be used to generate an effective control signal.

Another aspect of the invention provides an integrated circuit comprising a system set forth.

Another aspect of the invention provides a method of generating a control signal, comprising propagating acoustic sensor array data relating to a set of acoustic measurements at a set of sensor positions towards a set of propagated positions to obtain propagated data relating to the set of propagated positions; and generating a control signal based on the propagated data.

Another aspect of the invention provides a computer program product for causing a processor system to perform the method set forth.

It will be appreciated by those skilled in the art that two or more of the above-mentioned embodiments, implementations, and/or aspects of the invention may be combined in any way deemed useful.

Modifications and variations of the integrated circuit, the method, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Acoustic sensors in an array set-up may be used to monitor acoustic vibrations, typically in the near-field, produced by a vibration source. Acoustic holograms may be recorded in a real-time manner. Based on these holograms near-field acoustic holography (NAH) may be performed, which comprises an inverse calculation of a sound field in a wave-number (or spatial frequency) domain. The recorded sound field at the hologram may be transformed into vibrations occurring on the surface of the acoustic source. It is possible to calculate sound pressure, particle velocity and sound intensity in front of and on a source surface. To this end, it may be assumed that particle velocity of the air particles just in front of an object surface are a good approximation of vibrations of the object surface. The obtained information about the structural vibrations or sound-field may be used in a decision making system, such as a control system or a real-time monitoring unit.

Figure 1:
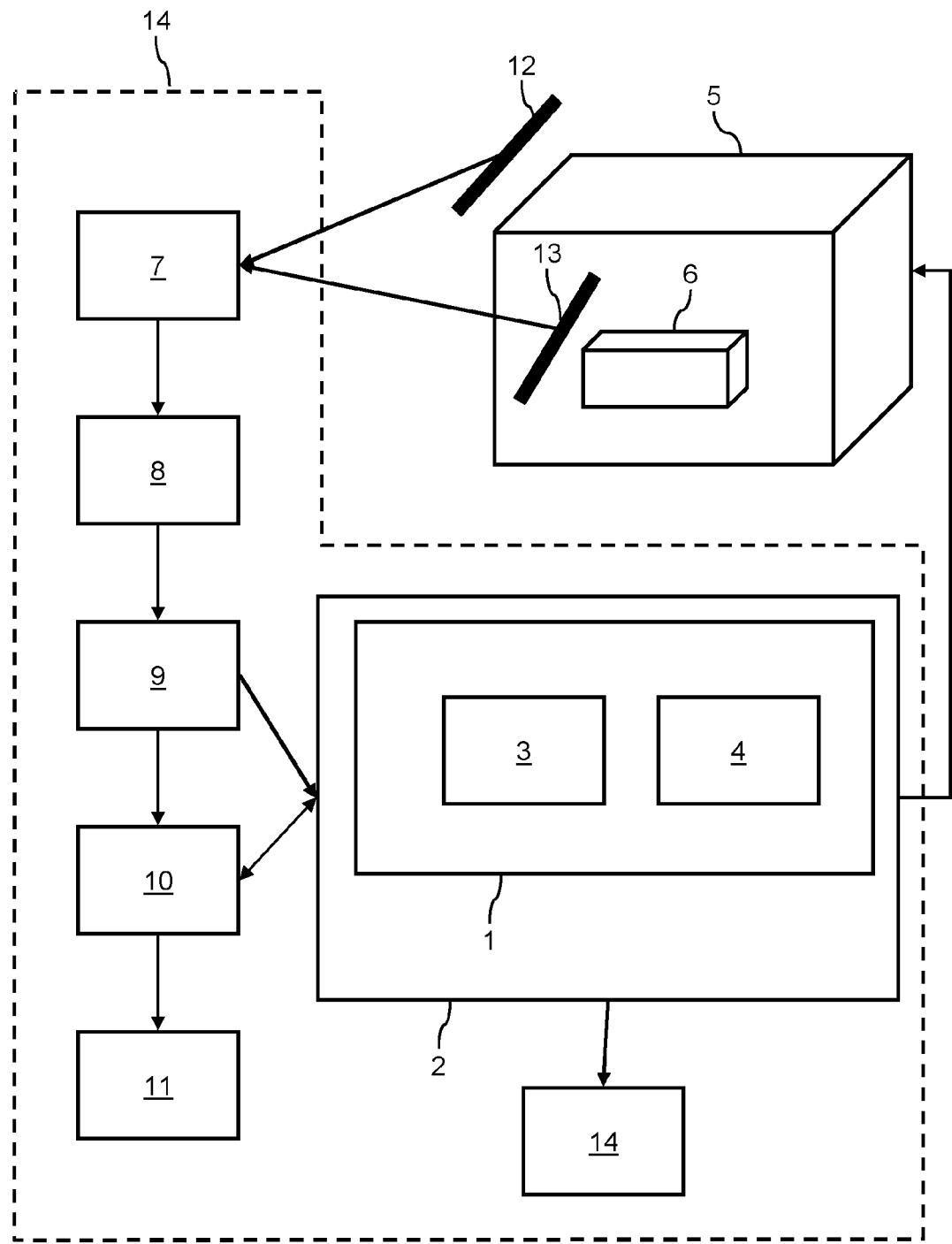
FIG. 1 is a block diagram of a system for generating a control signal.

FIG. 1 shows a block diagram of a control system, in particular a system for generating a control signal. The system may be implemented on an integrated circuit, or as a computer program stored on a computer readable storage medium and configured to be run on a computer system. The system may have electronic input and/or output ports, for example for connecting an acoustic sensor array to the input 7 or for providing the control signal to a controlled alarm signal generator 14 or apparatus 5.

The system may comprise a data propagator 9 configured to propagate acoustic sensor array data relating to a set of acoustic measurements at a set of sensor positions towards a set of propagated positions to obtain propagated data relating to the set of propagated positions. The set of sensor positions may cover an aperture. The data propagator 9 may be arranged for processing the data in a spatial frequency domain, however this is not a limitation. The set of sensor positions may be arranged in a plane. Other arrangements, such as three-dimensional arrangements, of the sensor positions are also possible. For example, the set of sensor positions may be arranged in a plurality of layers to form a multi-layer arrangement.

The system may comprise a control signal generator 2 for generating a control signal based on the propagated data. The control signal generator 2 may comprise a data analyzer 1 configured to analyze time-dependent sensor array data in a spatial frequency domain. The time-dependent sensor array data in the spatial frequency domain may be generated by near-field acoustic holography processing techniques. For example, sensor array data may be transformed into the spatial frequency domain, and propagated to another plane of interest before analysis. The data analyzer 1 may analyze the time-dependent sensor array data in the spatial frequency domain by means of signal processing techniques known in the art per se. The data analyzer 1 may alternatively or additionally be arranged for analyzing the time-dependent sensor array data in a spatial domain or in another kind of domain.

The control signal generator 2 may be configured to generate the control signal based on the analysis of the sensor array data. The control signal thus depends on the time-dependent sensor array data, for example the time-dependent sensor array data in the spatial frequency domain. The control signal may be configured to control a device or apparatus 5 or alarm generator 14. The data analyzer 1 and the control signal generator 2 may be configured to perform the analysis and generate the control signal in real-time, i.e., during data acquisition. This way, a closed loop control system or an alarm system may be implemented. The data analyzer 1 may be a subcomponent of the control signal generator 2.

The data analyzer 1 may comprise a spatial frequency selector 3 configured to separate at least one spatial frequency component in the sensor array data. For example, presence of a particular spatial frequency in the sensor array data is detected. The control signal generator 2 may be configured to trigger an alarm when the amplitude of that particular spatial frequency exceeds a threshold value or increases. The spatial frequency selector 3 may also be configured to separate a particular combination or range of spatial frequencies.

The data analyzer 1 may also comprise a pattern recognition module 4 for recognizing a pattern in the sensor array data in the spatial frequency domain or spatial domain. Pattern recognition techniques are known in the art per se. Pattern recognition techniques enable a sophisticated analysis of the data.

The data analyzer 1 may be arranged for detecting an alarm situation, based on the sensor array data. The control signal generator 2 may be arranged for generating a corresponding alarm signal in response to the detection of the alarm situation.

The system may comprise a sensor array and/or have an input 7 for receiving sensor array data measured by an external sensor array.

The sensor array data may relate to time-dependent and/or space-dependent vibration of at least part of an apparatus 5 or occurring within an apparatus 5. For example, the data is measured by means of a sensor array 12 arranged near a surface of the apparatus 5, and then transformed into a spatial frequency domain and propagated using acoustic holographic processing techniques towards the surface of the apparatus 5. The control signal generator 2 may be operatively coupled to the apparatus 5. This way, the control signal generator 2 may be configured to contribute to the control of the apparatus. A closed control loop may thus be established.

The sensor array data may relate to time-dependent and space-dependent vibration, flexing, or noise-making of at least part of a product 6 or occurring within a product 6 which is made by the apparatus 5. This way, the quality of the apparatus may be checked. The sensor array data may be measured by means of a sensor array 13 arranged near a surface of the product, and then transformed into a spatial frequency domain and propagated using acoustic holographic processing techniques towards the surface of the product 6. The control signal generator 2 may be operatively coupled to the apparatus 5. Again, a closed control loop may be established.

Alternatively, the sensor array data may relate to, for example, a monitored patient (not shown). The sensor array may be arranged on or near the patient's body surface, and measure vibrations or acoustics of the body. The control signal may be configured to control an alarm system and/or a medical device such as a medication supply or respiratory device.

The data analyzer 1 may be arranged for analyzing a product 6 which is a subject of the sensor array data, and wherein the control signal is coupled to a manufacturing apparatus 5 to control a manufacturing process of the same or similar products 6.

The system may comprise an input 7 configured to receive sensor array data from a sensor array 12,13. The sensor array data may represent a set of near-field holography measurements, for example acoustic measurements, at a first set of positions of the sensors of the sensor array 12,13, the first set of positions covering an aperture. The received sensor array data may be forwarded to a spatial frequency transformer 8 configured to apply a spatial frequency transform to the sensor array data. This way, the sensor array data is transformed into a spatial frequency domain, such as a spatial Fourier domain. The sensor array data in the spatial frequency domain may be provided to a data propagator 9 configured to propagate the sensor array data in the spatial frequency domain towards a second set of positions which may be different from the first set of positions, to obtain propagated data corresponding to the second set of positions. This propagated data is processed sensor array data or propagated sensor array data in the spatial frequency domain. The data analyzer 1 may be configured to analyze this propagated sensor array data in the spatial frequency domain.

The system may comprise a further spatial frequency transformer 10. This may be the same operational unit as the spatial frequency transformer 8, operating in a different mode. The further spatial frequency transformer 10 may also be implemented as an operational unit different from the spatial frequency transformer 8. The further spatial frequency transformer 10 may be configured to perform an inverse spatial frequency transform to the propagated data, to obtain reconstructed acoustic data in a spatial domain, representing respective acoustic signals at the second set of positions. The further spatial frequency transformer 10 may be configured to perform the inverse spatial frequency transform (only) when an alarm situation is detected. To that end, the control signal generator 2 may provide the control signal to the further spatial frequency transformer 10.

The spatial frequency transform may comprise a Fourier transform. It is noted that the spatial frequency transform may comprise a time-varying spatial frequency transform such as a wavelet transform or a short-time Fourier transform.

The system may comprise a pattern recognition module 11 configured to detect a location of a cause of the alarm situation, based on a result of the inverse spatial frequency transform. For example, the pattern recognition module 11 may be configured to find a sound source in the reconstructed acoustic data in the spatial domain.

An alarm generator 14 may be provided for generating an alarm, for example an auditive or visual alarm signal, based on the control signal from the control signal generator 2.

Apparatus 5 may comprise at least part of a production line. The product 6 made by the production line may comprise an electronic device, such as a computer, a mobile phone, a television, or an integrated circuit. The product 6 may further comprise an automobile or any other product.

The sensor array 12,13 may comprise a plurality of acoustic sensors arranged at a set of sensor positions. This set of sensor positions may be arranged in a regular grid.

However, this is not a limitation. The set of sensor positions may be arranged in a plane. Other, non-planar, arrangements of the sensor positions are also possible. For example, the set of sensor positions may be arranged in a plurality of layers to form a multi-layer arrangement. Such an arrangement may allow the use of improved noise suppression techniques. Other arrangements of the positions of the sensors of the sensor array are also possible. The sensor array 12,13 may comprise a support material for keeping the sensors in place. The signals generated by the sensor array may be coupled to input 7.

The system may be implemented in an integrated circuit. This integrated circuit may comprise the sensor array 12 or 13. In this case, the sensors of the sensor array 12,13 are mounted on or integrated with the integrated circuit. Alternatively, the sensor array and the integrated circuit comprising the system for generating a control signal may be implemented as separate devices.

It is noted that propagated acoustic data, such as generated by acoustic holography techniques, differs from e.g. beamforming techniques in that beamforming is more directed to sounds coming from a particular direction, whereas the propagated data used in this description relates to the acoustic or vibration patterns occurring at a set of propagated positions.

Figure 2:
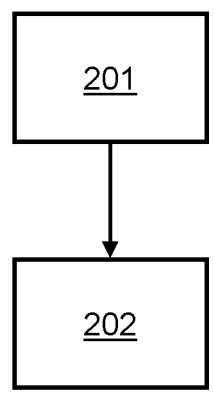
FIG. 2 is a flow chart of a method of generating a control signal.

FIG. 2 shows a flowchart of a method of generating a control signal. The method may comprise step 201 of propagating acoustic sensor array data relating to a set of acoustic measurements at a set of sensor positions covering an aperture towards a set of propagated positions to obtain propagated data relating to the set of propagated positions. The method may further comprise step 202 of generating a control signal based on the propagated data. The method may be modified or extended based on processing steps which may be performed by the system as described in this description. The method may be implemented as a dedicated integrated circuit, for example, or as a computer program product.

For control applications, such as real-time or near-real-time control applications, the results of holographic reconstruction may be made available in a relatively short time after performing the measurement. This may be aided by using wavelets or short-time Fourier Transforms (STFT) of the time intervals.

The systems and methods described herein may be implemented on a chip, such as an FPGA or an ASIC. Linear predictive border-padding and cut-off and slope iteration with a modified exponential filter may be implemented in hardware or as embedded software in an FPGA.

For nearby measurements a (microphone) sensor array integrated in a piece of silicon wafer may be employed for hologram measurement in close proximity to a vibrating source; spatial aliasing and/or disturbance of the sound field by the array may be taken into account.

A near-field acoustic holography (NAH) system may comprise one or more or all of 1—A digital microphone grid which may be mounted on a PCB array as the acoustic hologram measurement system.

2—An holography process which can be performed by standard multiply and sum operations on an FPGA. By using (short-time) FFT to acquire spatial frequency, k-space or wavenumber domain acoustic information (k-space hologram data), convolution integrals may be avoided to calculate the inverse or forward propagated sound and vibration field of the source. The inverse process, filtering and data handling can be performed by linear operations, which can be performed by standard (multiply and sum) operations in CPUs or FPGAs.

3—An automated holography process which reconstructs the source data without the intervention of a human operator.

4—A decision making system such as a control system or image detection system which may be implemented on a FPGA and which may be arranged for operating without necessary intervention of a human operator.

The techniques described herein may be used in many different application domains. In medical applications, it may be used for example in heartbeat monitoring. Other applications include mechanical/chemical installation monitoring, production monitoring/testing/quality control (vibrations and/or acoustics), monitoring of musical ensembles, vision systems for robots, active speech masking in public areas, such as restaurants, or in teleconferencing applications, monitoring of installations, sensor input for (mechatronic) control systems, automatic sound, vibration, and crack detection in a production line, real-time sensing for security applications.

The data analyzer may be arranged for analyzing groups of people, and the control signal may be coupled to a selection apparatus to selectively activate audiovisual media in response to the analysis.

The system, may comprise a set of sensor arrays applicable to autonomous (robot) systems to detect sound environments as an aid in the decision making process.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a floppy disc or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for generating a control signal for use in a closed control loop, comprising
   a data propagator for propagating acoustic sensor array data relating to a set of acoustic measurements at a set of sensor positions towards a set of propagated positions to obtain propagated data relating to the set of propagated positions, the set of acoustic measurements relating to an apparatus or a product manufactured using the apparatus; and
   a control signal generator for generating a control signal based on the propagated data, wherein
   the control signal generator is operatively coupled to the apparatus and configured to at least partly control the apparatus by means of the control signal to establish the closed control loop,
   and wherein
   the control signal generator comprises a data analyzer for analyzing the propagated data in a spatial frequency domain,
   the data analyzer comprises a spatial frequency selector for separating at least one spatial frequency component of the sensor array data in the spatial frequency domain,
   the control signal is based on information in the spatial frequency domain and on the separated spatial frequency component.

2. The system according to claim 1, wherein the data propagator is arranged for propagating the sensor array data in real-time and wherein the control signal generator is arranged for generating the control signal in real-time.

3. The system according to claim 1, wherein the control signal generator is arranged for detecting an alarm situation based on the propagated data and including a corresponding alarm signal in the control signal.

4. The system according to claim 1, comprising a sensor array for collecting the acoustic sensor array data relating to an apparatus or a product manufactured using the apparatus.

5. The system according to claim 1, wherein the propagated data is indicative of a vibration or flexing of at least part of the apparatus or at least part of the product.

6. The system according to claim 1, further comprising
   an input for receiving the acoustic sensor array data representing a set of holography measurements at the set of sensor positions; and
   a spatial frequency transformer for applying a spatial frequency transform to the sensor array data to obtain transformed sensor array data in a spatial frequency domain;
   wherein the data propagator is arranged for propagating the transformed sensor array data in the spatial frequency domain towards the set of propagated positions to obtain the propagated data relating to the set of propagated positions in the spatial frequency domain.

7. The system according to claim 6, comprising a further spatial frequency transformer for performing an inverse spatial frequency transform to the propagated data to obtain reconstructed data in a spatial domain, representing an acoustic signal at the set of propagated positions.

8. The system according to claim 7, wherein the further spatial frequency transformer is arranged for performing the inverse spatial frequency transform in response to an alarm situation indicated by the control signal.

9. The system according to claim 8, comprising a pattern recognition module for detecting a location of a cause of the alarm situation, based on the reconstructed data in the spatial domain.

10. The system according to claim 1, wherein the data analyzer comprises a pattern recognition module for recognizing a pattern in the sensor array data in the spatial frequency domain, the control signal also being based on information of the pattern recognition module.

11. The system according to claim 10, wherein the system is implemented in a Field Programmable Gate Array (FPGA) or an application specific integrated circuit (ASIC).

12. The system according to claim 1, wherein the system is implemented in a Field Programmable Gate Array (FPGA) or an application specific integrated circuit (ASIC).

13. An integrated circuit comprising the system according to claim 1.

14. A method of generating a control signal for use in a closed control loop, comprising
   propagating acoustic sensor array data relating to a set of acoustic measurements at a set of sensor positions towards a set of propagated positions to obtain propagated data relating to the set of propagated positions, the set of acoustic measurements relating to an apparatus or a product manufactured using the apparatus;
   generating a control signal based on the propagated data; and
   at least partly controlling the apparatus by means of the control signal to establish the closed control loop, wherein the generating of the control signal comprises
   analyzing the propagated data in the spatial frequency domain,
   separating at least one spatial frequency component of the sensor array data in the spatial frequency domain,
   generating the control signal based on the information in the spatial frequency domain and on the separated spatial frequency component.

15. A computer program product for causing a processor system to perform the method according to claim 14.

* * * * *